(12) United States Patent
Fischer

(10) Patent No.: US 10,895,860 B2
(45) Date of Patent: Jan. 19, 2021

(54) METHOD FOR OPERATING AN INDUSTRIAL CONTROL SYSTEM AND CORRESPONDING CONTROL SYSTEM

(71) Applicant: KEBA AG, Linz (AT)

(72) Inventor: Harald Fischer, Ebenau (AT)

(73) Assignee: KEBA AG, Linz (AT)

( * ) Notice: Subject to any disclaimer, the term of this patent is extended or adjusted under 35 U.S.C. 154(b) by 68 days.

(21) Appl. No.: 16/323,822

(22) PCT Filed: Aug. 28, 2017

(86) PCT No.: PCT/AT2017/060208
§ 371 (c)(1),
(2) Date: Feb. 7, 2019

(87) PCT Pub. No.: WO2018/039692
PCT Pub. Date: Mar. 8, 2018

(65) Prior Publication Data
US 2019/0187658 A1 Jun. 20, 2019

(30) Foreign Application Priority Data

Sep. 1, 2016 (AT) .............................. A 50774/2016

(51) Int. Cl.
*G05B 19/042* (2006.01)
*G05B 19/418* (2006.01)

(52) U.S. Cl.
CPC ..... *G05B 19/0428* (2013.01); *G05B 19/4184* (2013.01); *G05B 19/4185* (2013.01);
(Continued)

(58) Field of Classification Search
CPC ............ G05B 19/0428; G05B 19/4184; G05B 19/4185; G05B 2219/24168;
(Continued)

(56) References Cited

U.S. PATENT DOCUMENTS 5,402,472 A * 3/1995 MeLampy .............. H04M 3/48
379/212.01
6,717,382 B2 4/2004 Graiger et al.
(Continued)

FOREIGN PATENT DOCUMENTS

DE 10110776 A1 9/2001
DE 10 2010 025 781 A1 1/2012
(Continued)

OTHER PUBLICATIONS

International Search Report in PCT/AT2017/060208, dated Aug. 12, 2017.

*Primary Examiner* — Thomas C Lee
*Assistant Examiner* — Charles Cai
(74) *Attorney, Agent, or Firm* — Collard & Roe, P.C.

(57) ABSTRACT

A method operates an industrial control system, which includes at least one stationary control device and at least one control-technology-based manual operator-control instrument, which can be carried by an operator-control person. In at least one of the manual operator-control instruments, at least one data-technology-based identifier is resident, which represents at least the respective hardware version and the respective software status of the respective manual operator-control instrument. The mode of response of the respective control device or of the entire control system in relation to reliability or non-reliability of the establishment of a control-technology-based interaction, in relation to functional response during an active control-technology-based interaction and in relation to functional response in connection with a termination of a control-technology-based interaction between the respective control device and the manual operator-control instrument is determined or influenced in dependence on this data-technology-
(Continued)

based identifier. In addition, a correspondingly constructed control system is specified.

13 Claims, 2 Drawing Sheets

(52) U.S. Cl.
CPC .............. *G05B 2219/23161* (2013.01); *G05B 2219/24168* (2013.01); *G05B 2219/37095* (2013.01); *Y02P 90/02* (2015.11)

(58) Field of Classification Search
CPC ........... G05B 2219/37095; G05B 2219/23161; G05B 19/418; G05B 2219/33192; G05B 2219/36133; Y02P 90/14; Y02P 90/18; Y02P 90/20; G08C 17/02; H04L 12/40; H04L 12/28
See application file for complete search history.

(56) References Cited

U.S. PATENT DOCUMENTS

| | | | |
|---|---|---|---|
| 7,324,464 B2 | 1/2008 | Patz et al. | |
| 7,565,166 B2 | 7/2009 | Langenfelder et al. | |
| 7,650,205 B2 | 1/2010 | Calcagno | |
| 8,344,848 B2 | 1/2013 | Moeschl et al. | |
| 9,746,168 B1* | 8/2017 | Wu | H03K 17/96 |
| 2004/0131376 A1* | 7/2004 | Hashimoto | G03G 15/502 399/76 |
| 2008/0189449 A1* | 8/2008 | Souders | G06F 11/00 710/18 |
| 2010/0127824 A1* | 5/2010 | Moschl | G05B 19/4184 340/5.65 |
| 2011/0153034 A1 | 6/2011 | Philliben et al. | |
| 2011/0261777 A1* | 10/2011 | Maeda | H04W 48/20 370/329 |
| 2014/0220897 A1* | 8/2014 | Wan | H04W 12/003 455/41.2 |

FOREIGN PATENT DOCUMENTS

| | | |
|---|---|---|
| EP | 1 404 062 A1 | 3/2004 |
| EP | 1 659 466 A1 | 5/2006 |
| EP | 1 716 982 A1 | 11/2006 |
| EP | 1 866 712 B1 | 6/2012 |
| JP | 4085952 B2 | 5/2008 |
| JP | 4990504 B2 | 8/2012 |
| WO | 2006/105567 A2 | 10/2006 |
| WO | 2011/079300 A2 | 6/2011 |

\* cited by examiner

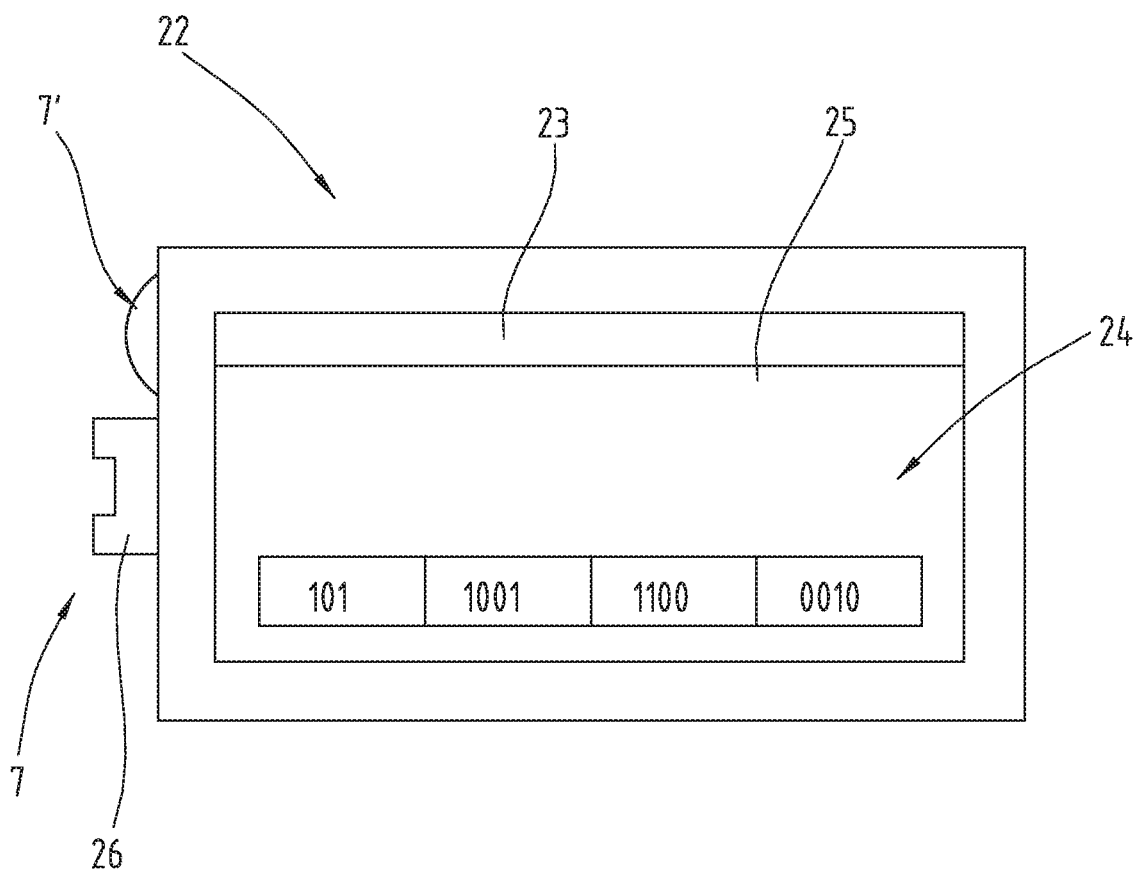

METHOD FOR OPERATING AN INDUSTRIAL CONTROL SYSTEM AND CORRESPONDING CONTROL SYSTEM

CROSS REFERENCE TO RELATED APPLICATIONS

This application is the National Stage of PCT/AT2017/060208 filed on Aug. 28, 2017, which claims priority under 35 U.S.C. § 119 of Austrian Application No. A 50774/2016 filed on Sep. 1, 2016, the disclosure of which is incorporated by reference. The international application under PCT article 21(2) was not published in English.

The invention relates to a method for operation of an industrial control system as well as to a corresponding control system.

In connection with control systems for operator control and automation of machines or comparable technical installations, substantially two basic concepts are known. On the one hand, it is possible to provide stationary operator-control units, which in other words are disposed in immobile manner. On the other hand, it is also known how to provide mobile operator-control units, especially operator-control units that can be brought along by an operator-control person to different points of use. In practice, industrial control systems also exist in which both concepts are realized. The said stationary operator-control units in such industrial control systems may be constituted by operator-control panels, which are built in fixed manner onto the machine and which may be formed from a screen for display of system-relevant data or information and from a keypad for operator control. In more recent generations, it is now possible to dispense with an extensive keypad and instead to provide a larger screen of touch-screen type.

According to a common feature, the said mobile operator-control units may be connected in fixed manner to the machine with a flexible multi-core cable, which has a particular length. By virtue of the said cable, the operator control or observation of the machine or of the installation is possible starting from various positions. It is essentially only by the cable length that the said operator-control person is limited in his or her local variability.

From the viewpoint of industry, it is desirable to be able to connect such mobile manual operator-control instruments selectively or as needed to the most diverse machines or their control devices. Thereby such manual operator-control instruments or control systems may be amortized relatively rapidly. Beyond this, in many cases it is not even necessary from the control-technology-based viewpoint that a manual operator-control instrument be permanently in connection to the control device of the respective machine or installation.

Increasingly, separately disposed terminal boxes or terminal units are also being designed, relative to which such mobile, cable-connected operator-control units may be coupled and uncoupled as needed. Among these terminal boxes, a distinction may then be made between terminal boxes with hot-plug capability and without hot-plug capability. In this context, hot-plug capability means that the mobile, cable-connected operator-control unit can be coupled and uncoupled during ongoing operation without thereby causing or necessitating an interruption of the control sequences. More recent generations of such mobile operator-control units may also be constructed in completely cable-connected manner and accordingly may have relatively highly developed, radio-technology-based communication interfaces. Above all, the operator-control units provided for wireless communication then involve considerable technical complexity, and extensive precautions have to be taken concerning the limited effective range and the pairing or the process of association between such a mobile operator-control unit and the controller that can be influenced therewith.

EP 1404062 A1 discloses a communication system having a multiplicity of subscribers, especially in the manner of machine controllers, connected to a data line. At various points of the hard-wired network, terminal units are disposed that are provided for connection of a portable operator-control and visualization terminal as needed. The respective terminal units respectively comprise a unique identifier, which can be read out from an operator-control and visualization terminal connected thereto. By virtue of this readable, unique identifier in the individual terminal units, it is possible to achieve a unique identification of the machine controller associated uniquely with the respective terminal unit. In particular, by virtue of this unique identifier, the portable operator-control and visualization terminal is connected to the respective intended machine controller using data technology or is associated with the correct installation area. This publication therefore relates to the selective logon or unique association of a portable operator-control and visualization terminal to a particular machine or to its control device.

Similar control systems, in which a unique identification is transmitted starting from at least one stationary control device or from a stationary terminal box to at least one portable terminal in order to permit the logon or association process are known, for example, from JP04085952B2, JP04990504B2 or EP1659466A1. All these documents relate to the logging of a portable electronic terminal onto a particular machine or onto a particular control device and to the sending of an identification to the mobile terminal.

In addition, from the prior art, control systems with technical features are known that are used for the establishment of a data-technology-based connection, that is as mistake-proof as possible, between a portable terminal and a machine or its controller. In the process, a unique, unmistakable identification is exchanged, i.e. transmitted bidirectionally, between the portable terminal and the machine controller. Such pairing features are known from DE10110776A1, EP1866712B1, DE102010025781A1 or EP1716982A1 among other sources. With these pairing features, it is indeed possible to establish a safe or unique association between a portable terminal and the respective machine controller, but further aspects are omitted that are expedient for an operation of a comprehensive control system that is safe or as harmless as possible. In particular, problems for which no workable solution has been known heretofore may occur in connection with control systems constructed in technologically mixed manner or in connection with gradually expanded control systems.

The task underlying the present invention is to create an improved industrial control system and a method for operation of a control system, wherein the corresponding control system may comprise a multiplicity of stationary control devices for machines and a multiplicity of types of mobile manual operator-control instruments that can be optionally connected thereto, and wherein, despite a technological mixed operation that may possibly occur in connection with differently designed mobile manual operator-control instruments, an operation of such a control system that is operationally safe or avoids errors as much as possible can be assured.

This task is accomplished by the features according to one aspect of the invention and by a control system having the characteristics according to another aspect of the invention.

One advantage of the features according to the invention lies in the fact that therewith an industrial control system can be created in which the concept of the mobile manual operator-control instruments capable of being coupled and uncoupled as needed, especially the wireless instruments but also the cable-connected instruments capable of being coupled and uncoupled as needed can be implemented in relatively problem-free manner. In the process, different normative requirements may be fulfilled or assured by the features according to the invention even when it is intended by an operator-control person to integrate, into the control system, via their potentially communication-compatible interfaces, manual operator-control instruments that are technologically diverse or that originate from different manufacturing periods. In particular, by the features according to the invention, it is possible to use diverse but still suitable types or manufacturing series of mobile manual operator-control instruments, especially different versions of terminal instruments, which under certain circumstances may also have different software statuses, without thereby encountering safety-related problems.

Namely, by the features according to the invention, it is ensured in advance of the construction of a control-technology-based interaction, during which potentially hazardous control commands could be executed, that it will be checked whether the respective combination between the mobile manual operator-control instrument and the control device permits or ensures a safe operation of the control system or of the respective machine or installation. This means that, prior to the construction of a control-technology-based interaction, an at least partly automated or fully automatic check takes place of the hardware-related and software-related compatibility between the mobile manual operator-control instrument provided for connection or coupling and the respective control device or the corresponding control system. In particular, high overall safety of the control system can be achieved by this advance compatibility check. For example, it is possible thereby to avoid situations in which, even though a mobile manual operator-control instrument can be connected in principle from the viewpoint of communications technology, an operative control-technology-based connection is not possible, or in which the operator-control person is denied accessibility into the control or movement sequences when the diverse normative specifications and safety requirements cannot be fulfilled by the respective combination or by the technological construction of the mobile manual operator-control instrument. This is accomplished in simple manner by the transmission of a data-technology-based identifier, starting from the manual operator-control instrument, to the respective control device or to the control system, and by the evaluation of this data-technology-based identifier by the control device or the control system, wherein this identifier comprises hardware-related and software-related parameters of the manual operator-control instrument. This compatibility check on the basis of a special data-technology-based identifier, which characterizes the respective technical manifestation of the mobile manual operator-control instrument, can then be implemented simply and relatively inexpensively, and so, despite a considerable gain in comfort and safety, the costs of implementation of such a control system can be kept as low as possible.

In addition, with the features according to the invention, the normative requirements—which are also often different from one country to another—for an automated technical installation or for its control system can be fulfilled in reliable and workable manner, and ultimately a high operative safety of correspondingly implemented control systems can be achieved. Among other possibilities, an extensive compliance with specifications or criteria, differing in country-specific and/or installation-specific manner, for a safe operation of a control system may be assured by the features according to the invention, particularly reliably and with relatively little expense.

The features according to an embodiment are also expedient, since thereby it can be determined in automated and simultaneously error-free manner whether the mode of operation or the functional scope of the manual operator-control instrument corresponds to the technical manifestations or requirements of the control system, especially whether adequate compatibility exists, in order to be able to assure safe operation of the control system in a manner conforming with the normative specifications.

Furthermore, by the features according to another embodiment, it is possible to evaluate, in automated manner, whether the hardware-related components and their operating software conform with the requirements of the respective control device or of the entire control system. Incompatibilities which may be concealed, as it were, and which in individual cases or special cases involving timing could become critical, especially any kind of hazardous situations occurring for persons or machine parts, can be reliably suppressed thereby.

This is correspondingly true for the features according to another embodiment. In particular, it can be ensured thereby that the software technology or software functionality implemented in the manual operator-control instrument conform with the requirements of the respective control device or of the control system.

Especially the features according to another embodiment are of particular advantage. Thereby it is possible to check, in automated manner, in the respective control system, a safety-related usability or an applicability of the manual operator-control instrument that is harmless from the safety-related viewpoint, before potentially hazardous control sequences can be influenced or controlled or created. In particular, it can be ensured thereby with respect to different types of safety switching elements that can be implemented in principle in manual operator-control instruments, that a combination and interaction that is respectively optimum or safe and/or conforms with the normative specifications is established between the manual operator-control instrument or between its safety switching element and the stationary control device or relative to the entire control system. In the case of unsuitable combinations, at least a control-technology-based influence or delivery of potentially safety-critical control sequences or control commands is suppressed in automated manner according to the invention, and thus the risk of hazardous situations is prevented. A loss of safety due to safety switching elements, which in terms of a machine or installation to be influenced are ultimately not suitable or not optimum, can therefore be suppressed particularly reliably.

Furthermore, the features according to another embodiment are advantageous, since thereby the respective technical manifestation of the safety switching elements respectively built into the diverse manual operator-control instruments is represented on the basis of the data-technology-based identifier. In particular, it is possible thereby to distinguish, in absolutely error-free and clear manner, with regard to different types or technical constructions of shutdown elements, for example with respect to standardized emergency-off switches, general stop elements or three-stage enabling switches with panic stop function. Thereby it is possible to ensure, especially in automated manner, that a safety switching element or shutdown element that does not conform with the safety requirements and is implemented or built into a manual operator-control instrument intended for control-technology-based coupling, is not integrated by means of control technology into the control system or into the respective stationary control device. Thereby it is ensured that an operator-control person using the manual operator-control instrument is able, in a suddenly occurring hazardous situation, to undertake, promptly and safely, the respective shutdown or termination of the safety-critical control sequence or of the potentially safety-critical movement of the machine or installation. Furthermore, it is possible thereby to take into account, in better manner, the respective normative safety requirements, which may be different in a manner specific to the country and/or may vary in a manner specific to the installation, and so combinations that are unreliable or are harmful from the safety-related viewpoint between a stationary control device or machine and a particular construction or type of a manual operator-control instrument can be suppressed reliably and especially in automated manner. In this context, it is important that the data-technology-based identifier of the manual operator-control instrument represents or characterizes the respective technical construction or safety category of the at least one safety switching element, especially of the at least one shutdown element built into the manual operator-control instrument. For this purpose, the respective data-technology-based identifier should therefore reflect the type or technical manifestation of the safety switching element in such a way that an automated evaluation capability is reliably permitted concerning the intended establishment of a control-technology-based interaction.

However, by the features according to another embodiment, the safety level of the combination of manual operator-control instrument and control system is also checked respectively in automated manner or raised to the respectively necessary standard. In particular, safety-critical situations may also occur if operator-control elements that are unsuitable or are optimum to only limited extent are provided in a manual operator-control instrument intended for control-technology-based integration. Such situations are reliably suppressed by the features according to claim 7. For example, it would be of concern to an extent critical to safety if the control device or a positioning or movement axis to be activated therewith needed a multi-axis operator-control element, for example a biaxial or triaxial joystick, on the manual operator-control instrument, but only single-axis operator-control elements are provided, for example in the form of several separately constructed rockers or rotary knobs for the diverse axes.

The features according to another embodiment are also of special advantage, since thereby existing control systems can be adapted in simple manner or fitted relatively inexpensively, in order to be able to implement the features according to the invention. In particular, a certain retrofittability of existing control systems is thereby possible in simple and also relatively inexpensive manner. For this purpose, the terminal unit may be understood as an add-on or sub-component designed as a peripheral of the respective control device or control system.

In this connection, the features according to another embodiment are also expedient, since thereby the terminal unit constructed structurally independently is able to fulfill, among other possibilities, the task of safety-related evaluation, and its control or checking logic is primarily able to implement the corresponding safety functionality.

By the features according to another embodiment, an automated evaluation takes place and thus the reliability of the check can be increased. In particular, thereby operator-control actions on the part of the user can be omitted or calls for check routines initiated on the part of the user can be avoided. This favors the overall safety and reliability of the corresponding system.

The features according to another embodiment are also expedient, since thereby, in connection with a disablement (override) of the safety functionality initiated intentionally by an operator-control person, even manual operator-control instruments that occasionally do not conform or conform only partly with the normative specifications can be integrated at least transitionally or temporarily into the control system. For this purpose, however, circuit releases to be performed intentionally or manually are necessary at the terminal unit or in the control system.

The features according to another embodiment are also advantageous, since thereby it is unmistakably signaled to an operator-control person whether the safety switching element built into the manual operator-control instrument is functionally available, in particular can be actuated in the serious situation or emergency and thereupon the control system or a corresponding machine or installation can be transformed with high reliability into a safe state or a direct shutdown is made possible. Furthermore, a feedback signal is provided thereby to the operator-control person, and thus a certain safety is imparted, whereby the acceptance on the part of the user for the corresponding control system may be further increased.

The features according to another embodiment are also expedient, since thereby it is unmistakably evident for an operator-control person whether the safety switching element implemented in the manual operator-control unit is integrated in the control system in such a way that, in case of need, an immediate shutdown and a reliable availability of this shutdown function are assured. Thereby the safety of the corresponding control system may also be increased. Such a construction is of advantage, especially in conjunction with manual operator-control instruments that can be connected in wireless or cable-free manner to a control device or to the control system, but is also expedient for cable-connected manual operator-control devices.

By the features according to another embodiment, it is possible to achieve a workable evaluation of the reliability or non-reliability or of the scope of the reliability of the coupling, planned or intended by an operator-control person, of a manual operator-control instrument relative to the respective control device.

The technical actions and advantageous effects attainable with the control system according to another embodiment can be inferred from the foregoing as well as following parts of the description.

For better understanding of the invention, it will be explained in more detail on the basis of the following figures.

Therein, respectively in greatly simplified schematic diagrams,

FIG. 2 shows a block circuit diagram of a terminal unit, which can be implemented in a control system according to FIG. 1.

Figure 1:
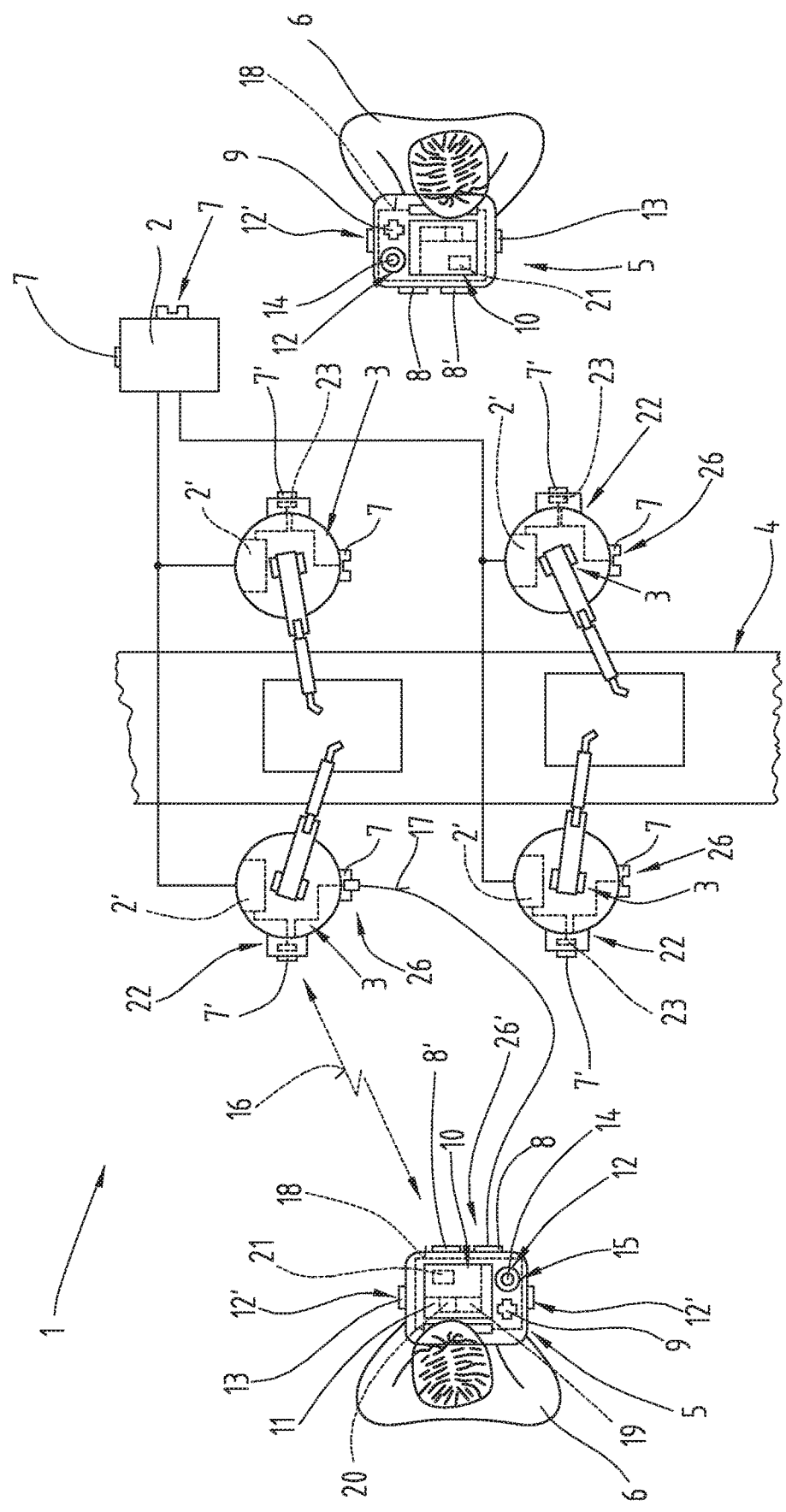
FIG. 1 shows a fabrication installation controlled by means of an electronic control system, which control system comprises several stationary control devices and mobile manual operator-control instruments that can be integrated optionally or as needed.

By way of introduction, it is pointed out that like parts in the differently described embodiments are denoted with like reference symbols or like structural part designations, wherein the disclosures contained in the entire description can be carried over logically to like parts with like reference symbols or like structural-part designations. The position indications chosen in the description, such as top, bottom, side, etc., for example, are also relative to the figure being directly described as well as illustrated, and these position indications are to be logically carried over to the new position upon a position change.

In FIG. 1, an exemplary embodiment of an industrial control system 1 is illustrated. Such a control system 1 comprises at least one electronic or electrotechnical control device 2, 2' disposed in stationary manner. At least individuals of these said stationary control devices 2, 2' are associated in the control-technology-based or functional respect with various machines 3 to be controlled according to plan. Accordingly, a complex industrial installation 4, for example a production or assembly installation, can be controlled with respect to the respective sequences with these control devices 2, 2'. For this purpose, the at least one stationary control device 2, 2' is connected via corresponding sensors and actuators to a machine 3 or installation 4 to be controlled, as is known in diverse embodiments from the prior art. A sub-component of such a said installation 4 may be a transport system, for example a conveyor belt, on which objects or workpieces to be machined are conveyed along individual machining stations. The said individual machining stations may respectively comprise at least one industrial robot or any other machine 3 that can be operated in automated or partly automated manner.

The individual stationary control devices 2, 2' may be connected together by any desired data-technology-based connections or network topologies to obtain a control-technology-based combination. For this purpose, as is known in itself, star-type, tree-type, serial and other network topologies or bus systems are possible. What is essential is that the diverse control devices 2, 2' disposed in distributed manner are networked with one another to at least some extent using data technology and thus are situated in a control-technology-based connection or are able to be in interaction and thus in combination are able to process a particular assembly or fabrication sequence. Via the corresponding control-technology-based or data-technology-based combination of several stationary control devices 2, 2' disposed in distributed manner, the respectively needed control or regulation sequences can therefore be executed in automated or at least partly automated manner within the control system 1 or by means of the technical installation 4. For example, an assembly or machining process is illustrated in which four industrial robots having respectively one control device 2' respectively associated with this functionally are used, and wherein a central master or control computer is provided in the form of the stationary control device 2.

The corresponding industrial control system 1 further comprises at least one mobile or portable, control-technology-based manual operator-control instrument 5. Such a manual operator-control instrument 5 is positionally variable or mobile, especially is portable by an operator-control person 6 and thus can be brought to various points of application or use. As is known in itself, such a manual operator-control instrument 5 may be used for observation and/or influencing of control-technology-based sequences within the control system 1, especially in regard to the respective control devices 2, 2' of the respective machine 3, of its machine parts, of the installation 4 or of the diverse installation parts. Due to the positionally variable portability of the manual control instrument 5, the said respective sequences or technical processes executed by the machine 3 or the installation 4 can be viewed in improved manner by the respective operator-control person 6, and in particular can be effectively controlled or monitored.

In order to be able selectively to influence or observe individuals of the machines 3 or individual installation parts of the installation 4 by control technology, the manual operator-control instrument 5 can be placed selectively in control-technology-based or data-technology-based interaction with the respective control devices 2, 2'. This corresponds to a control-technology-based or data-technology-based association or logon process between the manual operator-control instrument 5 and the respectively needed or desired machine 3 or installation 4, especially relative to the respective control device 2, 2' of the respective machine 3 or installation 4.

For this purpose, the at least one control device 2, 2' comprises, within the control system 1, at least one data-technology-based interface 7, 7' for establishment and termination of a control-technology-based interaction relative to a communication-compatible, control-technology-based manual operator-control instrument 5. In the local respect, the said data-technology-based interfaces 7, 7' may be directly associated with the respective control devices 2, 2' or may be remote from the respective electronic control devices 2, 2' and/or spaced apart from the respective machines 3, so that it is not unconditionally possible, on the basis of the diverse positions of the interfaces 7, 7', for an operator-control person 6 to deduce a functional association with the respective control device 2, 2'.

For establishment of such a control-technology-based interaction between one of the control devices 2, 2' and portable manual operator-control device 5 that in principle seems suitable in the technical respect to an operator-control person 6, at least one data-technology-based interface 8, 8' is also formed on the manual operator-control instrument 5. For this purpose, this at least one data-technology-based interface 8, 8' is then constructed in a manner that is compatible, especially communication-compatible, with at least one of the data-technology-based interfaces 7, 7' of the diverse control devices 2, 2'. For this purpose, the data-technology-based interfaces 8, 8' on the portable manual operator-control instruments 5 may be formed by wireless interfaces 8', especially by radio-technology-based communication ports and/or by hard-wired interfaces 8, especially by cable-connected, data-technology-based plug-type interfaces 26, 26'. Such plug-type interfaces 26, 26' for the establishment and disconnection of a cable connection 17 as needed may be provided directly on the housing of the manual operator-control instrument 5 and/or in the vicinity of the respective stationary control device 2, 2', for example in the vicinity of a machine 3 to be controlled, or may be constructed directly on a housing of a machine 3 to be controlled. Thus an association, which can be recognized in unambiguously plausible or unmistakable manner, between a mobile manual operator-control instrument 5 that can be coupled and uncoupled as needed and a machine 3 or its control device 2, 2', is not always easy for an operator-control person 6. This difficulty does not occur or hardly occurs in manual operator-control instruments 5 associated in fixed or permanent manner, but in manual operator-control instruments 5 of the stated type, which can be placed via their interfaces 8, 8' in interaction with interfaces 7, 7' of stationary control devices 2, 2' optionally and as needed and in particular can be used selectively, it is a challenge for the operator-control person 6, a risk of mistakes, and thus a potential error or hazard source. These problems can be countered by special logon or pairing procedures, such as are known, for example, from DE10110776A1 or EP1866712B1 assigned to the Applicant. Nevertheless, greater challenges for the operator-control person 6 may occur during the operation or the administration of such control systems 1 for complex technical installations 4 or for machines 3 that are difficult to understand, and so a need for corresponding improvements exists, as will be explained in the following.

As is known in itself, control-technology-based influences by means of the mobile or portable manual operator-control instrument 5 may be exerted by an authorized operator-control person 6 on the sequences, especially the movement sequences or the process sequences of the individual machines 3 or of the entire installation 4. For this purpose at least one operator-control element 9 that can be manually actuated by an operator-control person 6 is provided on the manual operator-control instrument 5. Such operator-control elements 9 may be formed by switching or actuating elements constructed on the basis of hardware technology, especially by joysticks, rotary knobs, trackballs, rockers and the like. However, the operator-control elements 9 for influencing of the control-technology-based sequences may also comprise so-called softkeys, which are implemented by software technology in the manual operator-control instrument 5 and in particular may be superimposed on a touch-sensitive display 10 of the manual operator-control instrument 5 as needed or if necessary. According to an advantageous embodiment, the display 10 or at least portions of the display 10 are formed by a so-called touch screen 11. Such a touch screen 11 therefore represents—as is known in itself—a combined input and output element, with which control-technology-based or data-technology-based inputs may be undertaken in relation to the control system 1 or in relation to the respectively connected control device 2, 2' and with which it is simultaneously possible to view system-relevant information and data relevant.

Since potentially safety-critical or hazardous control commands may also be delivered by means of the at least one operator-control element 9 on the manual operator-control instrument 5, or since sequence changes that are serious in some other way may be undertaken with respect to a machine 3 or installation 4, at least one safety switching element 12, 12' that can be manually actuated by an operator-control person 6 is formed on the manual operator-control instrument 5. By actuation or activation of such a safety switching element 12, 12' on the manual operator-control instrument 5, an initiation and/or a termination—depending on construction—of control commands of potentially safety-critical control sequences is made possible. In particular, at least one enabling switch 13, which is to be actuated actively or intentionally or brought into a predefined switching position on the part of the operator-control person 6 for an active initiation or for a definitive execution of potentially safety-critical control sequences or machine movements, may be constructed on the manual operator-control instrument 5. Thus the danger of the initiation of unwanted or unintended control commands or movement processes can be minimized. For this purpose, such a safety switching element 12' in the manner of an enabling switch 13 may also, depending on technical manifestation, be constructed with multi-stage or multi-function capacity and in the process may also permit the direct shutdown or termination of a potentially hazardous movement or control sequence. For this purpose, the enabling switch 13 may either be let go by the operator-control person or, in the case of a multi-stage or three-stage enabling switch 13, may be changed over to a separate so-called panic or emergency off position, in which a direct termination of the hazardous sequences or movements is then executed. This then corresponds to an emergency-stop or panic-stop command. Frequently, several optionally actuatable enabling switches 13 are constructed for this purpose at various positions, which respectively can be reached comfortably, on the manual operator-control instrument 5.

Above all, when the mobile manual operator-control instrument 5 is also provided for delivery of potentially safety-critical control commands, or when it can be used for influencing of the sequences within the control system 1, it may also be provided that at least one safety switching element 12 is formed on the manual operator-control instrument 5 in the manner of a so-called emergency off switch 14. In particular, at least one of the safety switching elements 12, 12' on the manual operator-control instrument 5 may be defined by a shutdown element 15, which is provided for avoidance or termination of hazardous or accident situations and is marked and designed accordingly. For this purpose, such a shutdown element 15 on the manual operator-control instrument 5 may be constructed in the manner of a standardized red-yellow emergency-off switch 14, in the manner of an off switch that can be illuminated or that glows to show functional availability, or in the manner of a general off switch. In this connection, the respective type of construction may be influenced or defined in particular by country-specific specifications, by standards, by the manifestation of the technical installation 4 or machine 3 and/or by the type and manner of the connection of the manual operator-control instrument 5 relative to the control system 1. For example, the technical construction of the shutoff element 15 may also be defined by whether the manual operator-control instrument 5 is to be coupled by means of control or signal technology, via a wireless communication link 16 or via a cable connection 17, to the respective control device 2, 2', especially to the machine 3 or installation 4 to be respectively influenced. Especially in the case of presence of a cable connection 17, which may also be constructed so that it can be plugged in and unplugged as needed, the shutdown element 15 may be formed on the manual operator-control instrument 5 by a standardized or normalized emergency-off switched 14 marked red-yellow. Especially when the manual operator-control instrument 5 can be coupled or is coupled with the respective control device 2, 2' via a wireless communication link 16 and/or via a cable connection 17 that can be plugged in and unplugged as needed, the shutdown element 15 may be formed expediently by an off switch that can be illuminated or that glows red to show functional availability. However, the shutdown element 15 may also be formed by a general off switch, i.e. by switching elements that differ visibly in their outer appearance from a standardized emergency-off switch 14. In particular, the outer appearance of an off switch that can be illuminated in dependence on its functional availability or of a general off switch is constructed differently relative to the at least partly standardized appearance of a red-yellow emergency-off switch 14.

The respective technical construction of the at least one safety switching element 12, 12' on the manual operator-control instrument 5 may be determined or influenced by normative specifications, by country-specific specifications, by the type of communication link to the control device 2, 2' (cable-connected or wireless) and/or by installation-specific characteristics. In particular, the technical manifestation of the safety switching element 12, 12' on the manual operator-control instrument 5 is different, in dependence on whether the control-technology-based interaction between the manual operator-control instrument 5 and the respective control device 2, 2' takes place or is established via a cable connection 17 or via a wireless communication link 16. In particular, it may be critical, in dependence on the functional reliability or technology of the wireless communication link 16, when an emergency-off switch 14 marked red-yellow is present on the manual operator-control instrument 5 during a wireless or cable-free operating state of the manual operator-control instrument 5. From this it is obvious that different manifestation or types and versions of manual operator-control instruments 5 are possible, which are or would be communication-compatible in principle with respect to their data-technology-based interfaces 8, 8' to diverse control devices 2, 2' but which could not be fully compliant with the respective environmental conditions or normative requirements and/or the technical circumstances of a machine 3 or installation 4 to be controlled. This problem is cured or suppressed by the features according to the invention.

In order to be able to integrate the manual operator-control instrument 5 into the control system 1 by means of control technology, it likewise comprises at least one electronic or electrotechnical control device 18 based on at least one microprocessor or microcontroller. In particular, the control device 18 in the manual operator-control instrument 5 may comprise a main processor 19, which is provided for fulfillment or provision of functionally relevant functions implemented with software technology. In addition, the control device 18 in a manual operator-control instrument 5 for industrial control purposes may comprise a safety processor 20, which may be in data-technology-based connection with the main processor 19 and is implemented primarily for fulfillment of tasks or functions relevant to safety engineering.

For implementation of the respective functionalities of the manual operator-control instrument 5, software or program code is resident in at least one memory of the manual operator-control instrument 5. In this situation, the respective software status determines the functionalities and/or the up-to-date status of the implemented functions. In addition, software components embedded in the hardware and relevant for operation, especially so-called firmware releases for diverse electronic components of the manual operator-control instrument 5, are resident in the manual operator-control device 5. For example, the radio-technology-based communication interface 8', but also the other data-technology-based interfaces 8 are provided with electronic components having respective software-implemented functions. The said firmware needed correspondingly for this is resident in suitable electronic memory units, especially in EEPROMs of the diverse electronic components. The version or up-to-date status of this said firmware may be different within several manual operator-control instruments 5. However, especially the so-called firmware status may influence the functional scope, or the respective firmware release for software-controlled electronic components in the respective manual operator-control instrument 5 may influence its response. Likewise, the sequences or functionalities of an independent safety processor 20 in the manual operator-controlled instrument 5 may be defined or influenced by version-dependent or update-dependent firmware or software statuses.

Beyond this, at least one identifier 21 for identification of the manual operator-control instrument 5 relative to the peripheral or external control devices 2, 2' is resident in the control device 18 of the manual operator-control instrument 5. This identifier 21 is typically filed in a non-volatile memory, for example in an EEPROM memory or in an SSD storage unit. As is known in itself, such an identifier 21 or a particular part of the identifier 21 may also be used for unique addressing or data-technology-based discrimination of the subscribers in the control system 1 in the course of control-technology-based logon or integration of the manual operator-control instrument 5 in the control system 1.

This is the case in particular when this identifier 21 or at least a particular part of the identifier 21 has a sufficiently high uniqueness or unmistakability.

In connection with the construction of the control system 1 according to the invention, it is essential that this data-technology-based identifier 21 in the manual operator-control instrument 5 characterizes or represents at least the respective hardware version and the respective software status of the manual operator-control instrument 5. In the course of establishment of a control-technology-based interaction or coupling between a manual operator-control instrument 5 and the control system 1 or relative to its control devices 2, 2', this data-technology-based identifier 21, starting from the manual operator-control instrument 5 provided for coupling, is transmitted to the respective control device 2, 2' or called from the respective control device 2, 2'. In particular, a so-called handshake takes place in this process or a communication or provision of the data-technology-based identifier 21 of the manual operator-control instrument 5 takes place, which data-technology-based identifier 21 is representative of the respective hardware-related and software-related construction of the manual operator-control instrument 5. This identifier 21 is therefore transmitted into the control system 1 or received by the respective control device 2, 2'. Subsequently, this identifier 21 read out from the manual operator-control instrument 5 and representative of its software and hardware configuration is evaluated by the control system 1 or by the respective control device 2, 2' provided for selective coupling, i.e. is evaluated by means of data technology. In the process, the mode of response of the respective control device 2, 2' or of the entire control system 1 is influenced or determined in dependence on these evaluation results. In particular, the response of the control device 2, 2' or of the control system 1 in relation to (i) reliability or non-reliability of the establishment of a control-technology-based interaction, in relation to (ii) functional response during an active control-technology-based interaction and in relation to (iii) functional response in connection with a termination of a control-technology-based interaction between the control device 2, 2' and the manual operator-control instrument 5 is defined or determined in dependence on the respectively acquired data-technology-based identifier 21. In particular, it is established, on the basis of this data-technology-based identifier 21 or by its evaluation, whether a reliable or hazard-free establishment of coupling between the respective manual operator-control instrument 5 and the respective control device 2, 2' is possible and/or how the ongoing operation and/or how the termination of this coupling or of the control-technology-based interaction corresponding to it has to be achieved. This is the case in particular in connection with the at least one safety switching element 12, 12', which may be built into respectively different technical manifestations on the manual operator-control instrument 5. Similar circumstances may occur in connection with different manifestations of operator-control elements 9 on diverse manual operator-control instruments 5, which operator-control elements 9 are intended or suitable for the delivery of potentially safety-critical control or movement sequences.

According to the invention, it is therefore detected or checked, in automated or partly automated manner, on the basis of the identifier 21 characteristic for the respective hardware and software design of the manual operator-control instrument 5, whether a safe control-technology-based interaction conforming with the diverse specifications and safety guidelines can or is permitted to be established. In particular, a control system 1 is created thereby that is especially functionally reliable or as safe from errors as possible and at the same time user-friendly.

In particular, it may be provided that the respective software status of the main processor 19 in the manual operator-control instrument 5 is represented by the data-technology-based identifier 21 of the manual operator-control instrument 5. In addition, it may be provided that the respective firmware status of electronic components of the manual operator-control instrument 5, for example of components relevant for communication, is represented by the data-technology-based identifier 21 resident in the manual operator-control instrument 5. Furthermore, it may be provided that the respective firmware or software status of a safety processor 20 that may be present within the manual operator-control instrument 5 is represented or characterized by the data-technology-based identifier 21. It is particularly expedient when the respective technical construction of the at least one safety switching element 12, 12' built into or implemented in the manual operator-control instrument 5 is represented by the data-technology-based identifier 21 of the respective manual operator-control instrument 5. Various technical construction options for safety switching elements 12, 12' have been explained at least in part in the foregoing.

Accordingly, the at least one safety switching element 12, 12' on the manual operator-control instrument 5 may be formed by a shutdown element 15 that can be actuated or activated by an operator-control person 6 as needed or in the emergency for avoidance or termination of hazardous or accident situations. For this purpose, such a shutdown element 15 may be constructed, among other possibilities, in the manner of a standardized red-yellow emergency-off switch 14, in the manner of an off switch that glows or can be illuminated to show functional availability, or in the manner of a general off switch. Especially the respective type of the technical construction of the shutdown element(s) 15 implemented on the manual operator-control instrument 5 is represented by the data-technology-based identifier 21 resident specifically in the respective manual operator-control instrument 5 and, in the course of an intended process of logon or integration of the manual operator-control instrument 5 in the control system 1, this data-technology-based identifier 21 is evaluated as to whether the manual operator-control instrument 5 provided for connection is suitable or possibly unsuitable as regards safety engineering. This evaluation result may turn out differently above all in dependence on the respective manifestation or of the respective location at which the control system 1 or the machine 3 or installation 4 is installed. In the case of several safety switching elements 12, 12', several data-technology-based identifiers 21 may then also be present, or an identifier 21 that is relatively more comprehensive as regards data technology may be implemented for this purpose.

By analogy with this, the technical construction of control-relevant operator-control elements 9 implemented on the manual operator-control instrument 5 may also be represented by the data-technology-based identifier 21, especially relative to illuminated pushbuttons, key-operated switches, joysticks, rotary knobs, 6D input elements and the like. This also has influence on whether the respective manual operator-control instrument 5 is as hazard-free as possible or can be integrated into the control system 1 in a manner conforming with the normative specifications or cannot or should not be integrated at all. Thus the respective data-technology-based interfaces 7, 7' of the control devices 2, 2' may in principle be compatible with the data-technology-based interfaces 8, 8' even when a communication link between the respective version of the manual operator-control instrument 5 and the respective version of the control device 2, 2' would not be possible without danger from the safety related viewpoint or would not conform in full scope to the normative specifications and/or country-specific guidelines. This problem is cured or suppressed by the features described herein.

According to a further-developed embodiment, the at least one data-technology-based interface 7, 7' of at least one stationary control device 2, 2' may also be formed on an electrotechnical or electronic terminal unit 22 constructed in structurally independent manner. Such a terminal unit 22 comprises in particular an electronic evaluation device 23, which can be coupled with the at least one stationary control device 2, 2' by means of data or signal technology and in particular can be integrated into the entire control system 1. Such a terminal unit 22 may—as schematically illustrated—be locally associated directly with the respective machines 3 or installations 4, or else may be positioned spaced apart therefrom, and be connected via control-technology-based connections, especially cable connections, to the respective control devices 2, 2'. In such cases, it is expedient when the evaluation of the data-technology-based identifier 21 of the respective manual operator-control instrument 5 is undertaken in the terminal unit 22, which may also be understood as a terminal box. The mode of response, based on the respective evaluation results, of the control system 1 or of the respective control device 2, 2' is therefore jointly influenced by the terminal unit 22. In particular, a simple and subsequent expansion of an existing control system 1 may be undertaken by the formation of an independent terminal unit 22.

It may be expedient when, in the course of an intended process of coupling between one of the control devices 2, 2' and a particular construction of a mobile manual operator-control instrument 5, the evaluation of the data-technology-based identifier 21 is undertaken in automated or compulsory manner. For this purpose it is provided that the control system 1 or the corresponding control device 2, 2' is transformed into a safe state, especially into the emergency-off state, in the case of absence or of non-recognition of a data-technology-based identifier 21 by a manual operator-control instrument 5 provided for control-technology-based connection. This transformation may take place if applicable with temporary advance warning or with delivery of a notification to the operator-control person 6. For this purpose, this notification may also be in association with a timer; in particular, a so-called watchdog may be integrated for this purpose.

Furthermore, a so-called override functionality may be implemented in the control system 1, especially in the manual operator-control instrument 5 or in the terminal unit 22. For this purpose, it is provided that the mode of response of the control system 1 can be configured or adjusted by means of the terminal unit 22 in such a way that a control-technology-based connection of a manual operator-control instrument 5 is permitted even when the manual operator-control instrument 5 lacks a data-technology-based identifier 21 or has a data-technology-based identifier 21 that in principle is unsuitable. For this purpose, it may be expedient for this override function to be capable of being activated or released only by an intentional positive action of the operator-control person 6.

By analogy with this, or in a manner similar thereto, it may be provided that the functional availability of the at least one safety switching element 12, 12' on the manual operator-control element 5 is evaluated by the control device 2, 2' or by the structurally independent or separately constructed terminal unit 22 and, in dependence on a positive and/or negative evaluation result, the respective evaluation result is appropriately signaled to the operator-control person 6 on the manual operator-control instrument 5 coupled by control technology. This may take place by text-based and/or by graphic signaling or display elements. Likewise, it may be provided that a positive evaluation result on the part of the control system 1 or on the part of the terminal unit 22 or on the part of the control device 2, 2' is signaled directly on the manual operator-control instrument 5. This may take place in particular via a shutdown element 15 that can be illuminated or that, in the case of a positive evaluation result, glows actively. In particular, it may be signaled to an operator-control person 6, by an evaluation-dependent activation of a preferably integrated illuminating means of the shutdown element 15, whether a positive or reliable coupling between the manual operator-control instrument 5 and the control system 1 or the respective control device 2, 2' could have been established or was established and/or whether the corresponding shutdown element 15 is functionally available. In the case of a shutdown element 15 that can be illuminated, such a positive or reliable coupling process is signaled by activation of the illuminating means of the shutdown element 15, which illuminating means is preferably provided for emission of red or reddish light.

As already explained in the foregoing, a high system safety can be achieved by the specified technical features. This is the case above all in conjunction with mobile manual operator-control instruments 5 that can be plugged in and unplugged as needed, but also in relation to so-called wireless terminals, and therefore in the manner of wirelessly communicating manual operator-control instruments 5. Thus even different normative requirements, which are respectively applicable in particular in various countries, may be fulfilled better or complied with safely by the various operator-control persons 6. Likewise, various types of mobile terminal devices with various optional operator-control elements 9 and different software statuses in a control system 1 according to the invention are not able to lead to a loss of safety. Besides optionally implementable operator-control elements 9 on a manual operator-control instrument 5, various manifestations of how the emergency-off switch 14 can be configured are also possible. It is also possible for the software statuses of the terminal units 22 disposed in decentralized or distributed manner to be different within a corporate group. Despite this possible mixed operation and the various normative specifications, a control system 1 operated according to the invention always has a high safety level and a response in conformity with the standards or according to plan.

By virtue of the proposed features, therefore, diverse country-specific and/or installation-specific specifications and/or normative regulations can be reliably fulfilled or complied with. For example, certain specifications or guidelines with respect to the requirements of a standardized or red-colored emergency-off switch 14, of the applicability of a general stop switch or of the usability of an emergency-off switching element that can be illuminated or that glows may be reliably complied with by the specified features. Furthermore, regulations pertaining to the response of the control system 1 or of a safety switching circuit of the control system 1 or of the technical installation 4 or machine 3 with respect to the response during unplugging and plugging-in of a manual operator-control instrument 5 having a safety switching element 12, 12' can be reliably implemented thereby. On the one hand, therefore, control systems 1 are possible in which, during unplugging of a manual operator-control instrument 5 having a red emergency-off switch 14, the safety switching circuit of the machine 3 or installation 4 must be activated and thereupon the respective machine 3 or installation 4 is placed in a shutdown state or in a safe state. Alternatively, systems are possible in which, during unplugging of a manual operator-control instrument 5 having a general shutdown element or having a gray stop switch, the safety switching circuit may remain deactivated, i.e. no safety shutdown has to or is supposed to take place. Beyond this, control systems 1 or machines 3 or installations 4 are possible in which an emergency-off shutdown element 15 that is illuminated or that in particular glows red to show functional availability is not permitted to be used, or only such a shutdown element 15 is permitted to be used. By virtue of the data-technology-based identifier 21 and the evaluation features according to the invention, it is possible to take these regulations of broad scope or involving many variations reliably into account.

By virtue of the features according to the invention, it is also possible to ensure simply and reliably that the manual operator-control instrument 5 connected to the control system 1 is able and permitted to interact with the machine 3 or installation 4 as well as to ensure that a definite compatibility exists. For example, it may be, in dependence on the control system 1 or on the machine 3 or installation 4, that particular operator-control elements 9 must be present, that certain operator-control elements 9 are not permitted to be used, that different software statuses are not permitted to be used and/or that wirelessly communicating manual operator-control instruments 5 are not permitted to be used or are permitted only in a very small or restricted range of action next to the respective terminal unit 22 or machine 3. Among other possibilities, these regulations or requirements may be reliably complied with or fulfilled in error-proof manner by the features according to the invention.

The features according to the invention therefore permit improved compliance with a plethora of safety-related, installation-specific and country-specific specifications and do so even though highly variable possibilities and thus associated difficulties of a mixed operation of various manual operator-control instruments 5 and various terminal units 22 exist. This diversity may then involve respectively software-related and/or hardware-related aspects, as will be explained on the following on the basis of an overall view of FIGS. 1 and 2. According to an expedient embodiment, therefore, an identifier 24 may also be provided in the terminal unit(s) 22 of the control system 1, as is schematically illustrated in FIG. 2. This identifier 24, which is specific to or characteristic of the respective terminal unit 22, is preferably present directly in the respective terminal unit 22. In particular, the identifier 24 may be resident in a non-volatile memory device 25 of the terminal unit 22. The data-technology-based contents of the identifier 24 may then be composed of the following parameters, the contents or values of which must be adapted with any change of the hardware and/or software of the terminal unit 22, wherein these contents or value changes must also be changed in country-specific and installation-specific manner or adapted thereto. In regard to the respective software status, the data-technology-based identifier 24 may relate to the respective status of the firmware of the electronic components and/or to the status of the software of the main processor and/or to the firmware and software of a safety processor that may be implemented in the terminal unit 22. In regard to the respective hardware construction of the respective terminal unit 22, it may be provided that the data-technology-based identifier 24 reflects whether a half-plugged recognition and/or a fully-plugged recognition is implemented in the terminal unit 22 with respect to a plug-type interface 26 on the terminal unit 22 or with respect to the respective control device 2, 2', and/or whether a current measurement or current monitoring is provided for automated checking of a proper connection of a manual operator-control instrument 5 to the respective plug-type interface 26.

However, the data-technology-based identifier 24 of the respective terminal unit 22 or control device 2, 2' may also be composed or one or more of the country-specific and installation-specific parameters listed in the following: a) maximum number of failed plug-in or coupling attempts before an initiation of emergency off; and/or b) response upon plugging-in of a manual operator-control instrument 5 that does not possess any data-technology-based identifier 21; and/or c) response upon unplugging of a manual operator-control instrument 5 having a standardized red-yellow emergency-off switch 14; and/or d) response upon unplugging a manual operator-control instrument 5 having a general stop switch; and/or e) response upon unplugging a manual operator-control instrument 5 having an off switch that is illuminated to show functional availability; and/or f) response upon plugging-in of a manual operator-control instrument 5 having a valid data-technology-based identifier 21; and/or g) response upon plugging-in of a manual operator-control instrument 5 having a red-yellow emergency-off switch 14, a general stop switch and/or an off switch that can be illuminated. Furthermore, a list containing data-technology-based identifiers 21 valid for the terminal unit 22 or for its associated control devices 2, 2' or parameter values of compatible manual operator-control instruments 5 may be resident in the memory device 25 of the terminal unit 22.

Thus the internally resident data-technology-based identifier 21 is sent by the manual operator-control instrument 5 directly to the terminal unit 22 simultaneously with the plugging-in or immediately upon wireless coupling. Thereupon the terminal unit 22 compares the received data-technology-based identifier 21 or its contents or parameter values with the compatibility list filed in it or with the country-specific and installation-specific specifications saved in it. From this, the response of the respective control device 2, 2' or of the control system 1 is derived upon plugging-in and/or during unplugging of this manual operator-control instrument 5 and/or, during ongoing operation, is derived in cooperation with this manual operator-control instrument 5.

Possible modes of response during a) plugging-in or connection, b) during operation and c) during unplugging or uncoupling of a manual operator-control instrument 5 are then as follows:

Re a) If no data-technology-based identifier 21 is recognized during plugging-in or wireless connection of a manual operator-control instrument 5, it may be provided that the control device 2, 2' or the respective machine 3 is transformed into the safe state (emergency off) immediately or after a defined time interval. On the other hand, if a data-technology-based identifier 21 is received that permits a safe operation or a reliable combination to be recognized, the terminal unit 22 switches on the manual operator-control instrument 5 or, in this case, a release is signaled or issued to the respective control device 2, 2'.

Re b): In regard to the response of the control device 2, 2' or of the control system 1 during a reliable or released operation with the manual operator control instrument 5, it may be provided that, in the case of a shutdown element 15 or emergency-off switch that can be illuminated, its illuminating means, especially its LED, is activated and if applicable its lighting function or signaling function is monitored. Furthermore, it may be provided that, in the case of compatible operator-control elements 9 on the manual operator-control instrument 5, these are released or can be used or that, in the case of incompatible operator-control elements 9, these are not released and cannot be used. If need be, limited functions of the manual operator-control instrument 5, especially its observation or visualization functions, may nevertheless be released with regard to the respective control device 2, 2' in such a case.

Re c): In dependence on the content-related significance or significances of the data-technology-based identifier 21 of the manual operator-control instrument 5, it may be provided that, in the course of unplugging or uncoupling of the manual operator-control instrument 5, the respective control device 2, 2' or machine 3 continues to run by virtue of hot-unplug functionality, and or, in the case of lack of hot-unplug functionality, is transformed into a safe state (emergency off) and/or is transformed into an error state, because a manual operator-control instrument 5 having a general stop switch has been unplugged or uncoupled.

A characteristic of the features according to the invention lies in the fact that manual operator control instruments 5 constructed identically from the viewpoint of hardware and software have the same data-technology-based identifier 21. Thereby they also induce respectively the same response at the terminal unit 22 or at the respectively associated control device 2, 2'. The response of the control system 1 or of the respective control device 2, 2' is namely influenced by the data-technology-based identifier 21 or by its contents or parameter values. The fact that the data-technology-based identifier 21 is then sent starting from the manual operator-control instrument 5 or is supplied upon request and is evaluated in the terminal unit 22 or in the respective control device 2, 2', is relatively more expedient for this purpose than is the principle inverse to this, especially in connection with the sequences in the course of a process of unplugging or uncoupling of a manual operator-control instrument 5.

The respective predefined modes of response of the control system 1 may then be saved in the control devices 2, 2' or in the terminal units 22, wherein the respective response is called up or adjusted in automated manner depending on data-technology-based identifier 21 of the manual operator-control instrument 5 provided for coupling. The data-technology-based identifier 21 therefore represents a kind of quasi-key information, which is transmitted in the course of establishment of a connection of the manual operator-control instrument 5 to the control device 2, 2' or terminal unit 22 in question or must be communicated or supplied in advance of the establishment of a control-technology-based ability of the manual operator-control instrument 5 to be influenced.

In particular, it may be provided that a list or data records is or are resident in a memory device 25 of at least one of the terminal units 22 and that, by automated comparison of the data-technology-based identifier 21 received by a manual operator-control instrument 5 with this list or with these data records, it is determined whether the combination between the respective control device 2, 2' and this manual operator-control instrument 5 provided for coupling is reliable or unreliable.

The exemplary embodiments show possible embodiment variants, wherein it must be noted at this place that the invention is not restricted to the specially illustrated embodiment variants of the same, but to the contrary, diverse combinations of the individual embodiment variants with one another are also possible and, on the basis of the teaching of the technical handling by the subject invention, this variation possibility lies within the know-how of the person skilled in the art and active in this technical field.

The scope of protection is defined by the claims. However, the description and the drawings are to be used for interpretation of the claims. Individual features or combinations of features from the shown and described different exemplary embodiments may represent inventive solutions that are independent in themselves. The task underlying the independent inventive solutions may be inferred from the description.

Finally, it must be pointed out, as a matter of form, that some elements have been illustrated not to scale and/or enlarged and/or reduced for better understanding of the structure.

LIST OF REFERENCE NUMERALS

1 Control system
2, 2' Control device
3 Machine
4 Installation
5 Manual operator-control instrument
6 Operator-control person
7, 7' Data-technology-based interface
8, 8' Data-technology-based interface
9 Operator-control element
10 Display
11 Touch screen
12, 12' Safety switching element
13 Enabling switch
14 Emergency-off switch
15 Shutdown element
16 Wireless communication link
17 Cable connection
18 Control device
19 Main processor
20 Safety processor
21 Identifier
22 Terminal unit
23 Evaluation device
24 Identifier
25 Memory device
26, 26' Plug-type interface

The invention claimed is:

1. A method for operation of an industrial control system, comprising at least one stationary control device and at least one control-technology-based manual operator-control instrument, which can be carried by an operator-control person, which can be connected at least to one control device having sensors and actuators of a machine or installation to be controlled, and which the at least one control device is provided with at least one data-technology-based interface for establishment and termination as needed of a control-technology-based interaction with the at least one portable control-technology-based manual operator-control instrument, wherein such a control-technology-based interaction is established via at least one second data-technology-based interface of the at least one manual operator-control instrument to be connected, and wherein the at least one manual operator-control instrument is provided with at least one safety switching element that can be manually actuated by the operator-control person for initiation and/or termination of potentially safety-critical control commands and/or control sequences, and having at least one data-technology-based identifier, assigned to the respective manual operator-control instrument, for identification of the respective manual operator-control instrument relative to the at least one control device, wherein
the data-technology-based identifier of the manual operator-control instrument represents at least one respective hardware version and one respective software status of the respective manual operator-control instrument, wherein, prior to the establishment of the control-technology-based interaction, the data-technology-based identifier, starting from the manual operator-control instrument provided for connection, is transmitted to the at least one control device or is called from the at least one control device, wherein the data-technology-based identifier is evaluated by the at least one control device, wherein a mode of response of the respective control device or of the entire control system in relation to (i) reliability or non-reliability of the establishment of the control-technology-based interaction, in relation to (ii) functional response during the active control-technology-based interaction and in relation to (iii) functional response in connection with a termination of the control-technology-based interaction between the respective control device and the manual operator-control instrument is determined in dependence on these evaluation results, wherein the technical construction of the at least one safety switching element in the respective manual operator-control instrument is represented by the data-technology-based identifier, and wherein the at least one safety switching element on the manual operator-control instrument is formed by a shutdown element for avoidance or termination of hazardous or accident situations, wherein such a shutdown element is formed in the manner of a standardized red-yellow emergency-off switch, in the manner of an off switch that can be illuminated or that glows to show functional availability, or in the manner of a general off switch, and wherein the respective type of the technical construction of the shutdown element implemented on the respective manual operator-control instrument is represented by the data-technology-based identifier.

2. The method according to claim 1, wherein the respective software status of a main processor of the respective manual operator-control instrument is represented by the data-technology-based identifier.

3. The method according to claim 1, wherein the respective firmware status of electronic components of the respective manual operator-control instrument is represented by the data-technology-based identifier.

4. The method according to claim 1, wherein the firmware or software status of a safety processor in the respective manual operator-control instrument is represented by the data-technology-based identifier.

5. The method according to claim 1, wherein the technical construction of control-relevant operator-control elements implemented on the respective manual operator-control instrument is represented by the data-technology-based identifier.

6. The method according to claim 1, wherein the data-technology-based interface is constructed, in relation to the at least one stationary control device, on a terminal unit constructed in structurally independent manner, wherein the terminal unit comprises an electronic evaluation device and the evaluation device can be coupled with the at least one stationary control device by means of data or signal technology.

7. The method according to claim 6, wherein the evaluation of the data-technology-based identifier is undertaken in the terminal unit and the mode of response, based on the respective evaluation results, of the control system or of the respective control device is jointly influenced by the terminal unit.

8. The method according claim 1, wherein, in the course of a process of coupling between the at least one stationary control device and the manual operator-control instrument, the evaluation of the data-technology-based identifier is undertaken in automated manner and wherein, in the case of absence or of non-recognition of a data-technology-based identifier, the control system or the at least one control device is transformed into a safe state.

9. The method according to claim 6, wherein the mode of response of the control system or of the at least one stationary control device can be configured by means of the terminal unit in such a way that a control-technology-based connection of the manual operator-control instrument that lacks a data-technology-based identifier is permitted.

10. The method according to claim 1, wherein the functional availability of the at least one safety switching element on a manual operator-control element is evaluated by the at least one stationary control device or by a terminal unit and a positive and/or negative evaluation result is signaled to the manual operator-control instrument, which is coupled by control technology or is provided for coupling.

11. The method according to claim 10, wherein the positive evaluation result is signaled to the manual operator-control instrument, which is equipped with a shutdown element, which can be illuminated or is capable of glowing actively, by activation of an illuminating means of the shutdown element.

12. The method according to claim 6, wherein a list is or data records are resident in a memory device of the terminal unit and wherein, an automated comparison of the data-technology-based identifier received by the terminal unit with the list or with the data records determines whether the combination between the respective control device and the manual operator-control instrument provided for coupling is reliable or unreliable.

13. An industrial control system, comprising at least one stationary control device and at least one control-technology-based manual operator-control instrument, which can be carried by an operator-control person, which can be connected at least to one control device having sensors and actuators of a machine or installation to be controlled, and which the at least one control device is provided with at least one data-technology-based interface for establishment and termination as needed of a control-technology-based interaction with the at least one portable control-technology-based manual operator-control instrument, wherein such a control-technology-based interaction is established via at least one second data-technology-based interface of the at least one manual operator-control instrument to be connected, and wherein the at least one manual operator-control instrument is provided with at least one safety switching element that can be manually actuated by the operator-control person for initiation and/or termination of potentially safety-critical control commands and/or control sequences, and having at least one data-technology-based identifier, assigned to the respective manual operator-control instrument, for identification of the respective manual operator-control instrument relative to the at least one control device, wherein the data-technology-based identifier of the manual operator-control instrument represents at least one respective hardware version and one respective software status of the respective manual operator-control instrument, wherein, prior to the establishment of the control-technology-based interaction, the data-technology-based identifier, starting from the manual operator-control instrument provided for connection, is transmitted to the at least one control device or is called from the at least one control device, wherein the data-technology-based identifier is evaluated by the at least one control device, wherein a mode of response of the respective control device or of the entire control system in relation to (i) reliability or non-reliability of the establishment of the control-technology-based interaction, in relation to (ii) functional response during the active control-technology-based interaction and in relation to (iii) functional response in connection with a termination of the control-technology-based interaction between the respective control device and the manual operator-control instrument can be determined in dependence on these evaluation results, wherein the technical construction of the at least one safety switching element in the respective manual operator-control instrument is represented by the data-technology-based identifier, and wherein the at least one safety switching element on the manual operator-control instrument is formed by a shutdown element for avoidance or termination of hazardous or accident situations, wherein such a shutdown element is formed in the manner of a standardized red-yellow emergency-off switch, in the manner of an off switch that can be illuminated or that glows to show functional availability, or in the manner of a general off switch, and wherein the respective type of the technical construction of the shutdown element implemented on the respective manual operator-control instrument is represented by the data-technology-based identifier.

\* \* \* \* \*